United States Patent
Boldi et al.

(10) Patent No.: US 10,237,865 B2
(45) Date of Patent: Mar. 19, 2019

(54) FRONTHAUL LOAD DYNAMIC REDUCTION IN CENTRALIZED RADIO ACCESS NETWORKS

(71) Applicant: Telecom Italia S.p.A., Milan (IT)

(72) Inventors: Mauro Boldi, Turin (IT); Paolo Gianola, Turin (IT); Bruno Melis, Turin (IT)

(73) Assignee: Telecom Italia S.p.A., Milan (IT)

( * ) Notice: Subject to any disclaimer, the term of this patent is extended or adjusted under 35 U.S.C. 154(b) by 60 days.

(21) Appl. No.: 15/321,621

(22) PCT Filed: Jun. 23, 2014

(86) PCT No.: PCT/EP2014/063135
§ 371 (c)(1),
(2) Date: Dec. 22, 2016

(87) PCT Pub. No.: WO2015/197102
PCT Pub. Date: Dec. 30, 2015

(65) Prior Publication Data
US 2017/0150497 A1 May 25, 2017

(51) Int. Cl.
*H04W 72/04* (2009.01)
*H04L 5/00* (2006.01)
(Continued)

(52) U.S. Cl.
CPC ....... *H04W 72/0433* (2013.01); *H04L 5/0007* (2013.01); *H04W 56/001* (2013.01);
(Continued)

(58) Field of Classification Search
CPC .............. H04L 5/0007; H04W 56/001; H04W 72/0433; H04W 72/0446; H04W 72/1278; H04W 88/085
See application file for complete search history.

(56) References Cited

U.S. PATENT DOCUMENTS 7,283,787 B2 * 10/2007 Diao ................. H04B 7/155
375/212
8,693,429 B2 * 4/2014 Montojo ............. H04L 25/0226
370/328
(Continued)

FOREIGN PATENT DOCUMENTS

EP     2574138 A1    3/2013
EP     2582109 A2    4/2013
(Continued)

OTHER PUBLICATIONS

Aug. 29, 2014—(WO) ISR and Written Opinion—App PCT/EP2014/063135.
(Continued)

*Primary Examiner* — Dung B Huynh
(74) *Attorney, Agent, or Firm* — Banner & Witcoff, Ltd.

(57) ABSTRACT

A method is proposed of arranging, in a mobile communication network, transmission of data between user equipment and a base station including a central unit and at least one remote unit associated therewith. The data includes information data and, associated with the information data, first control data substantially time-varying over a scheduling time period, and second control data substantially time-unvarying over the scheduling time period. The method includes at the central unit side, transmitting the information data and the first control data to the at least one remote unit, and at the at least one selected remote unit side, receiving the information data and the first control data from the central unit, generating the second control data, combining the generated second control data with the received information and first control data into the data, and transmitting the data to a selected user equipment.

20 Claims, 3 Drawing Sheets

Figure 1A:
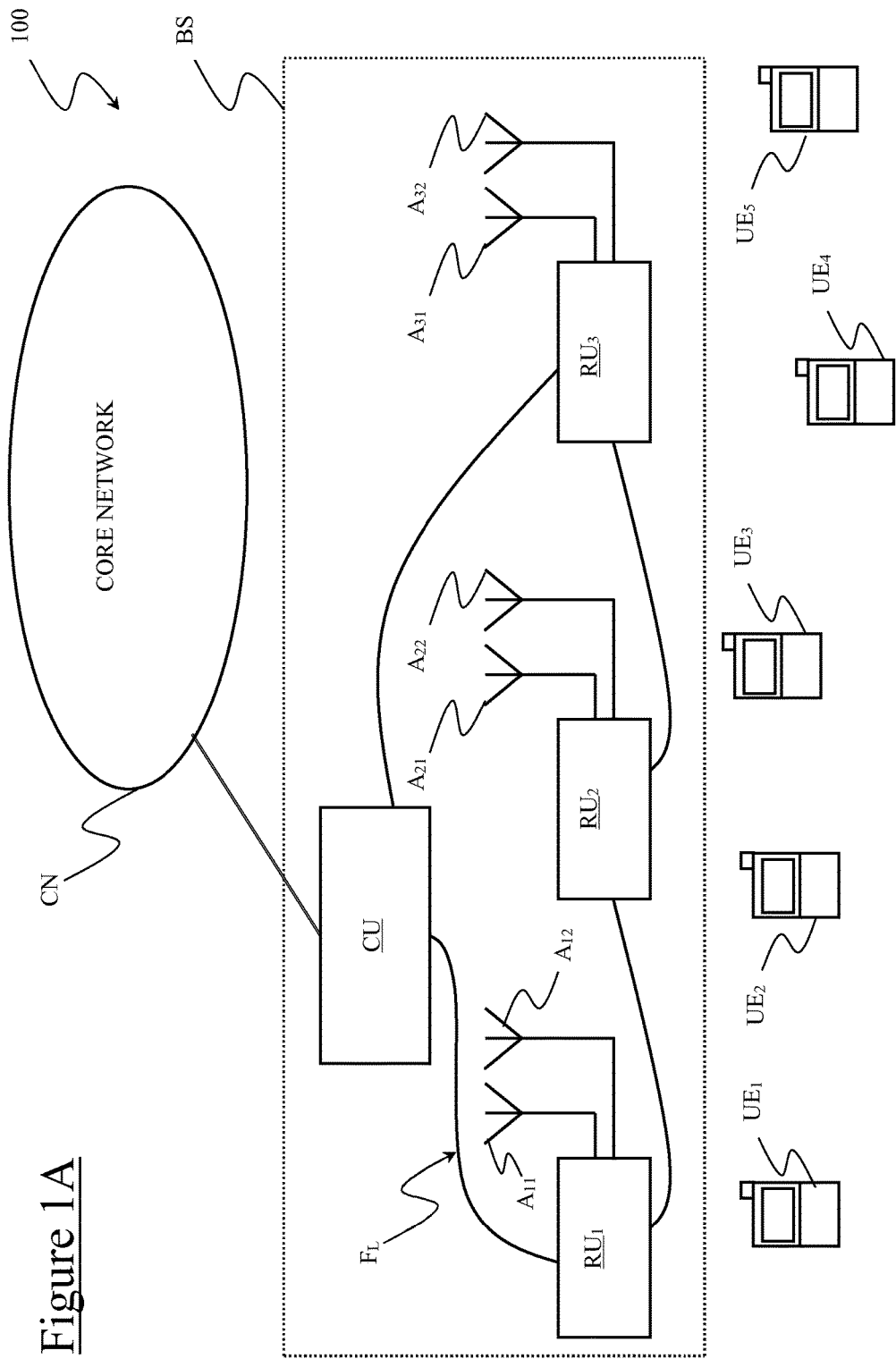

(51) Int. Cl.
  *H04W 88/08* (2009.01)
  *H04W 56/00* (2009.01)
  *H04W 72/12* (2009.01)
(52) U.S. Cl.
  CPC ... *H04W 72/0446* (2013.01); *H04W 72/1278* (2013.01); *H04W 88/085* (2013.01); *H04L 5/0048* (2013.01); *H04L 5/0053* (2013.01)

(56) References Cited

U.S. PATENT DOCUMENTS

| | | | | |
|---|---|---|---|---|
| 2002/0159506 | A1* | 10/2002 | Alamouti | H04B 7/0617 375/147 |
| 2003/0086366 | A1* | 5/2003 | Branlund | H04B 1/71052 370/208 |
| 2003/0157943 | A1* | 8/2003 | Sabat, Jr. | H04B 7/2606 455/456.1 |
| 2004/0266459 | A1* | 12/2004 | Lee | G01S 5/021 455/456.6 |
| 2008/0014992 | A1* | 1/2008 | Pescod | H01Q 1/246 455/562.1 |
| 2008/0026797 | A1* | 1/2008 | Nanda | H01Q 1/246 455/562.1 |
| 2009/0191891 | A1* | 7/2009 | Ma | G01S 1/68 455/456.1 |
| 2009/0238566 | A1* | 9/2009 | Boldi | H04W 88/085 398/59 |
| 2009/0268910 | A1* | 10/2009 | Liu | H04J 11/0079 380/268 |
| 2010/0085936 | A1* | 4/2010 | Bellamkonda | H04W 36/0077 370/331 |
| 2010/0165882 | A1* | 7/2010 | Palanki | H04W 76/14 370/254 |
| 2010/0178875 | A1* | 7/2010 | Oh | H04B 7/022 455/63.1 |
| 2010/0208656 | A1* | 8/2010 | Oh | H04W 16/12 370/328 |
| 2011/0177827 | A1* | 7/2011 | Crilly, Jr. | H04W 52/143 455/456.1 |
| 2011/0255631 | A1* | 10/2011 | Pi | H03M 13/09 375/295 |
| 2011/0305190 | A1* | 12/2011 | Seki | H04B 7/155 370/315 |
| 2012/0039172 | A1* | 2/2012 | Kim | H04W 28/08 370/235 |
| 2012/0046056 | A1* | 2/2012 | Luo | H04J 11/005 455/502 |
| 2012/0066396 | A1* | 3/2012 | Kang | H04L 12/1868 709/226 |
| 2012/0213261 | A1* | 8/2012 | Sayana | H04L 5/0048 375/224 |
| 2012/0329503 | A1* | 12/2012 | Jongren | H04W 52/10 455/509 |
| 2013/0095873 | A1* | 4/2013 | Soriaga | H04B 7/024 455/509 |
| 2013/0100907 | A1* | 4/2013 | Liu | H04L 5/0023 370/329 |
| 2013/0315113 | A1* | 11/2013 | Seo | H04L 5/001 370/280 |
| 2013/0324137 | A1* | 12/2013 | Liu | H04W 28/08 455/449 |
| 2013/0343318 | A1* | 12/2013 | Gruet | H04L 5/001 370/329 |
| 2014/0219255 | A1* | 8/2014 | Eyuboglu | H04W 72/12 370/336 |
| 2014/0323147 | A1* | 10/2014 | Junhyo | H04W 64/00 455/456.1 |
| 2015/0271793 | A1* | 9/2015 | Fischer | H04B 10/25752 455/450 |
| 2015/0365966 | A1* | 12/2015 | Wang | H04L 5/0048 370/329 |
| 2016/0192181 | A1* | 6/2016 | Choi | H04B 7/26 455/422.1 |
| 2016/0270016 | A1* | 9/2016 | Harel | H04B 7/04 |

FOREIGN PATENT DOCUMENTS

| | | |
|---|---|---|
| WO | 2006/102919 A1 | 10/2006 |
| WO | 2010/075864 A1 | 7/2010 |
| WO | 2013/048526 A1 | 4/2013 |

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP Standard; 3GPP TS 36.211, 3rd Generation Partnership Project (3GPP), Mobile Competence Centre ; 650, Route Des Lucioles ; F-06921 Sophia-Antipolis Cedex ; France, vol. RAN WG1, No. V12.1.0, Mar. 18, 2014 (Mar. 18, 2014), pp. 1-120, XP050769984 [retrieved on Mar. 18, 2014].

Clark Chen et al: "Suggestions on Potential Solutions to C-RAN", No. Ver 4.0, Jan. 3, 2013 (Jan. 3, 2013), pp. 1-41, XP002704068, Retrieved from the Internet <URL:http://www.ngmn.org/uploads/media/NGMN_CRAN_Suggestions_on_Potential_Solutions_to_CRAN.pdf>.

* cited by examiner

FRONTHAUL LOAD DYNAMIC REDUCTION IN CENTRALIZED RADIO ACCESS NETWORKS

BACKGROUND OF THE INVENTION

Field of the Invention

The present invention generally relates to mobile communication networks—hereinafter, mobile networks. More specifically, the present invention relates to mobile networks based on a "Centralized Radio Access Network" (CRAN) architecture.

The work leading to the present invention has received funding from the European Union's Seventh Framework Program FP7/2007-2013 under grant agreement n. 317941—project iJOIN.

Overview of the Related Art

A CRAN typically comprises one or more central units each one connected to a plurality of remote units (preferably by means of respective optical fiber links).

According to a conventional CRAN architecture, in the downlink, the central unit receives data to be transmitted to user equipment of the mobile network, and provides a digital base-band signal. The digital base-band signal is then converted from electrical to optical, and transmitted to the remote units over optical fiber links. Each remote unit receives the optical base-band signal, which is then converted from optical to electrical, filtered, converted from digital to analog, up-converted from base-band to radio-frequency and amplified, before being radiated by antennas to the user equipment.

In radio access technologies based on OFDMA ("Orthogonal Frequency Division Multiple Access"), such as WiMAX ("Worldwide Interoperability for Microwave Access"), and LTE ("Long Term Evolution")/LTE-A ("LTE-Advanced"), the digital base-band signal is a composite digital base-band signal, namely it is composed of signals for different user equipment (or user signals) that are superimposed in the time domain.

Each conventional CRAN (based on optical fiber links) thus provides for transmission of one (optical) composite base-band signal (over the fiber links) for each (transmitting) antenna of each remote unit when downlink is considered, or of one (optical) composite base-band signal (over the fiber links) for each (receiving) antenna of each remote unit when uplink is considered, with such a transmission that takes place in the time-domain (e.g., according to "Open Base Station Architecture Initiative" (OBSAI) or "Common Public Radio Interface" (CPRI) standards. As a result of that, as the number of remote units connected to a given central unit increases, the available transmission capacity on the fiber links may rapidly become a bottleneck. Additionally, the available transmission capacity on the fiber links may also be saturated by a relatively low number of signals, especially when taking into account the growing data rate that the new radio access technologies impose—and that is expected to grow further with the forthcoming techniques such as "Multiple Input Multiple Output" (MIMO) and carrier aggregation techniques.

Some prior-art solutions have been addressed to such issues.

Signal processing algorithms have been proposed (such as "adaptive beamforming" and "network coordination" algorithms) that operate on each user signal separately.

WO2006/102919, "A radio Access Method, related base station, mobile radio-network and computer program product using an assignment scheme for antennas' sectors", discloses a system comprising a radio base station for a mobile network, and a set of remote units connected to the radio base station, preferably via a "Radio Over Fiber" (ROF) arrangement. Each remote unit provides radio coverage by means of a set of communication channels, and is equipped with a respective set of antenna elements. The communication channels are distributed over the antenna elements according to an assignment scheme that is dynamically variable.

WO2010/075864, "A Method for distributed Mobile Communications, corresponding system and computer program product", discloses a method of arranging exchange of signals between user terminals in a cellular communication system and at least one base station. The base station includes a central unit and a plurality of remote units. The signals are exchanged between the central unit and the remote units as aggregated signals for plural user equipment. The signals are processed at the remote units as distinct signals each associated to a respective one of the plural user equipment. Specifically, WO2010/075864 illustrates a method to reduce data over radio over fiber links (usually referred to as "fronthaul", in order to distinguish these links from "backhaul" links, which instead connect the central unit to the mobile transport network) based on frequency domain transmission. This is achieved by arranging IFFT/FFT modules in the remote units, and transmitting signals in the frequency-domain.

SUMMARY OF INVENTION

The Applicant has found that the above-cited solutions are not fully satisfactory for modern technological requirements.

Specifically, the Applicant has found that conventional CRAN architectures wherein signal processing operations are delegated to the central units are affected by flexibility issues, as any algorithm changes may involve software and/or hardware modifications in the central unit, as well as scalability issues, as involving a limitation on a maximum number of remote units that can be connected to a given central unit.

These issues are exacerbated in CRAN architectures relying on signal processing algorithms operating on each user signal separately (such as "adaptive beamforming" and "network coordination" algorithms), as application of such algorithms requires that signal processing operations are performed at a central unit side (wherein the user signals are still separately available), thus further burdening the central unit. The applicant thus believes that for effective application of such algorithms, data rate of the signals transmitted over the fiber links should be reduced.

The Applicant has found that, although frequency-domain transmission approach disclosed in WO2006/102919 and WO2010/075864 allows a relevant reduction of the data rate with respect to traditional time-domain based methods, data rate of the signals transmitted over the fiber links should be further reduced in order to meet modern requirements of increase of the maximum number of remote units that can be connected to a given central unit.

In view of the above, the Applicant has devised a solution aimed at overcoming these, as well as other, drawbacks. Specifically, the Applicant has devised a system and a method for dynamically reducing fronthaul load (comprising information and control data) by transmitting, from a transmitting side (e.g., the central unit), only a part of the control data over the fronthaul link, with the other part of the control data that is instead generated and processed directly within receiving side (e.g., the remote unit/units).

One or more aspects of the solution according to embodiments of the invention are set out in the independent claims, with advantageous features of the same solution that are set forth in the dependent claims (whose wording is enclosed herein verbatim by reference).

More particularly, the solution according to embodiments of the present invention relates to a method of arranging, in a mobile communication network, transmission of data between user equipment and a base station comprising a central unit and at least one remote unit associated therewith. The data comprise information data and, associated with the information data, first control data substantially time-varying over a scheduling time period, and second control data substantially time-unvarying over the scheduling time period. The method comprises:

at the central unit side, transmitting the information data and the first control data to the at least one remote unit, and at the at least one selected remote unit side,
  receiving the information data and the first control data from the central unit,
  generating the second control data,
  combining the generated second control data with the received information and first control data into the data, and
  transmitting the data to a selected user equipment.

According to an embodiment of the present invention, each one of the plurality of remote units is associated with at least one cell of the mobile communication network, and the second control data comprise reference data. The generating the second control data comprises generating at least one pseudo-random sequence each one associated with a respective one of the at least one cell of the mobile communication network.

According to an embodiment of the present invention, the generating at least one pseudo-random sequence further comprises initializing each generated pseudo-random sequence with an initialization value depending on a cell identifier univocally identifying the cell.

According to an embodiment of the present invention, the data comprise "Orthogonal Frequency Division Multiple" symbols, and the at least one pseudo-random sequence depends on slot number within a radio frame, an "Orthogonal Frequency Division Multiple" symbol number within the slot, and on radio resource number.

According to an embodiment of the present invention, the transmitting comprises transmitting in the frequency domain.

According to an embodiment of the present invention, the second control data further comprise synchronization data.

According to an embodiment of the present invention, the generating the second control data comprises generating primary synchronization data from a frequency-domain Zadoff-Chu sequence depending on a first parameter identifying the cell within a given cells group, and generating secondary synchronization data from a sequence comprising an interleaved concatenation of two length-31 binary sequences, and depending on a second parameter identifying the cells group.

According to an embodiment of the present invention, the combining the generated second control data with the received information data into the data comprises multiplexing and mapping the generated second control data with the received information and first control data.

Another aspect of the solution according to embodiments of the present invention relates to a system for exchanging data with user equipment in a mobile communication network. The data comprises information data and, associated with the information data, first control data substantially time-varying over a scheduling time period, and second control data substantially time-unvarying over the scheduling time period. The system comprises at least one remote unit adapted to be associated with a central unit and configured to:

receive the information data and the first control data from the central unit, generate the second control data, combine the generated second control data with the received information and first control data into the data, and transmit the data to a selected user equipment.

According to an embodiment of the present invention, the system further comprises the central unit, the central unit being configured to transmit the information data and the first control data to the at least one remote unit.

According to an embodiment of the present invention, the at least one remote unit is connected to the central unit by means of optical fiber links.

According to an embodiment of the present invention, the at least one remote unit is connected to the central unit by means of wireless communication links.

A further aspect of the solution according to embodiments of the present invention relates to a computer program product for performing the method of above when the computer program product is run on a computer.

BRIEF DESCRIPTION OF THE ANNEXED DRAWINGS

Figure 1B:
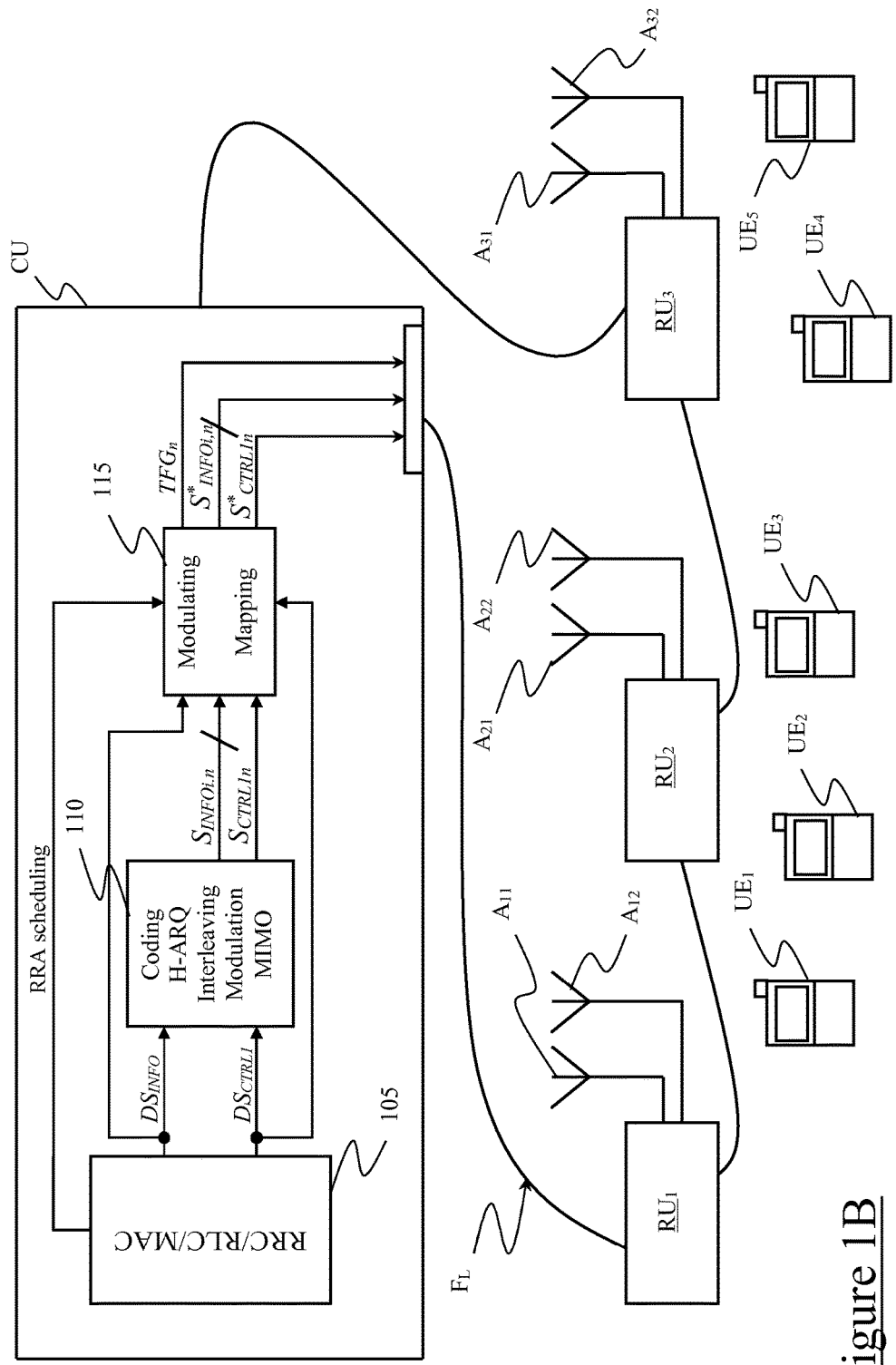
Figure 2:
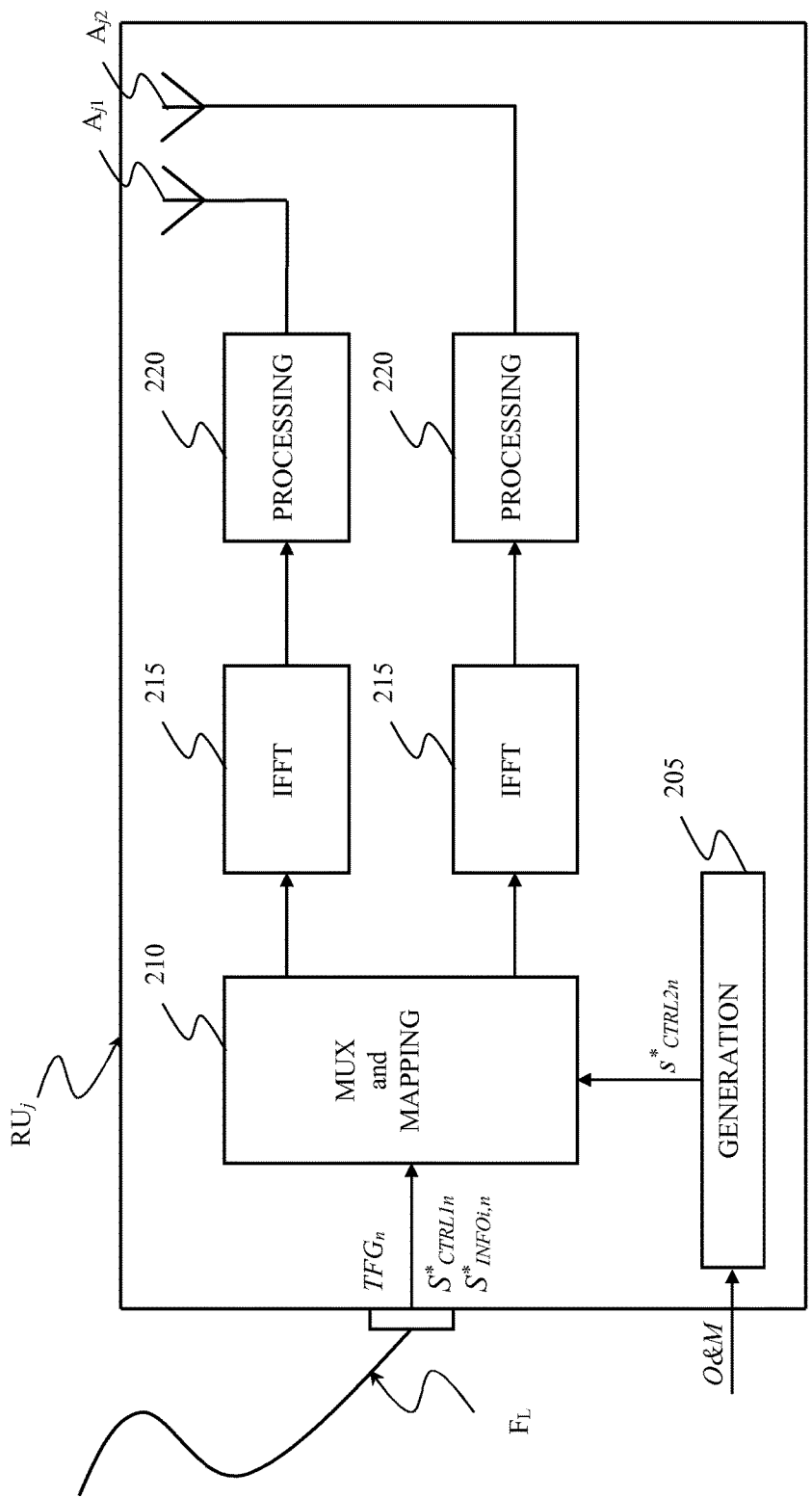

These and other features and advantages of the present invention will be made apparent by the following description of some exemplary and non limitative embodiments thereof. For its better intelligibility, the following description should be read making reference to the attached drawings, wherein:

FIGS. 1A-1B schematically show a mobile communication network, and a portion thereof, respectively, according to an embodiment of the present invention, and FIG. 2 schematically shows a remote unit of such a mobile communication network according to an embodiment of the present invention.

DETAILED DESCRIPTION OF PREFERRED EMBODIMENTS OF THE INVENTION

With reference to the drawings, FIGS. 1A-1B schematically show a mobile communication network (hereinafter, mobile network) 100, and a portion thereof, respectively, according to an embodiment of the present invention.

The mobile network 100 allows data to be transmitted between user equipment $UE_i$ (i=1, 2, . . . , I), such as the user equipment $UE_1$-$UE_5$ (I=5), and one or more base stations, such as the base station BS.

The mobile network 100 is for example compliant with the 3GPP LTE/LTE-Advanced or WiMAX standards. However, the principles of the present invention generally apply to any mobile network based on an OFDM ("Orthogonal Frequency Division Multiplexing") technique, and are particularly advantageous when applied to mobile networks further based on a MIMO ("Multiple Input Multiple Output") technique.

According to OFDM technique, data to be transmitted (including both information data and control data) are split into data sequences, the data sequences are modulated by separate and reciprocally orthogonal sub-carriers and multiplexed into a stream of data including OFDM symbols, or OFDM symbols stream, for transmission. According to MIMO technique, multiple OFDM symbols streams are transmitted/received via multiple transmitting/receiving antennas, which improves communication performance without additional bandwidth or increased transmission power.

As known, OFDM technique is based on radio resources allocation in time/frequency domain. Considering for example the 3GPP LTE/LTE-Advanced standard, in time domain radio resources are distributed every "Transmission Time Interval" (TTI), each one lasting 1 ms (sub-frame) and comprising two time slots of 0.5 ms, whereas in frequency domain the whole bandwidth is divided into a plurality of 180-kHz sub-channels (each one corresponding to 12 adjacent and equally spaced sub-carriers). A radio resource comprising a number of OFDM symbols (e.g., seven) spanning over one time slot in time domain and twelve adjacent sub-carriers in frequency domain is referred to as "Physical Resource Block" (PRB), and corresponds to the smallest radio resource that can be allocated to the i-th user equipment $UE_i$ for transmission.

According to the preferred, not limiting, illustrated embodiment, the mobile network 100 is based on "Centralized Radio Access Network" (CRAN) architecture, wherein each base station BS (or at least one of the base stations of the mobile network 100) comprises a central unit, such as the central unit CU, and one or more remote units $RU_j$ associated therewith (e.g., coupled or connected thereto)—j=1, 2, . . . , J, with J=3 in the example at issue. As illustrated, the central unit CU is preferably connected, on one side, to the remote units $RU_j$, e.g. by means of an (e.g., ring) optical fiber link $F_L$ (also referred to as fronthaul link), and, on the other side, to a core network CN (e.g., by means of a proper wired or wireless link also referred to as backhaul link). Each remote unit $RU_j$ comprises a number K of transmitting/receiving antenna $A_{j,k}$ (K=1, . . . , K, with K=2 in the example at issue) for transmitting data from the central unit CU to plural user equipment $UE_i$ (and, hence, to plural remote units $RU_j$) and for transmitting data from plural user equipment $UE_i$ (and, hence, from plural remote units $RU_j$) to the central unit CU.

In the following, in order to discuss a practical scenario, reference will be exemplarily made to a CRAN architecture wherein base-band functionalities are distributed between the central unit CU and the remote units $RU_j$. Such a CRAN architecture, thoroughly discussed in WO2010/075864, is now well-known in the art, thus only relevant aspects thereof strictly necessary to the understanding of the present invention will be introduced and described hereinafter (with some other aspects that, instead, will be intentionally omitted for the sake of conciseness).

Moreover, in the following description reference will be made to downlink transmission only, which the present invention is mainly intended to.

As illustrated in FIG. 1B, the central unit CU comprises a control module 105 implementing higher layer protocols, such as "Radio Resource Control" (RRC), "Radio Link Control" (RLC) and "Medium Access Control" (MAC) layers, for receiving data for plural users equipment $UE_i$ (e.g., through a conventional S1 interface), and for providing corresponding "Transport Blocks" comprising information $DS_{INFO}$ and control $DS_{CTRL,1}$ channels or data streams to plural user equipment $UE_i$ (and, hence, to one or more remote units $RU_j$ identifying cells which the addressed user equipment $UE_i$ belong to).

Preliminarily, as should be understood, the term "module is herein intended to contemplate either hardware or software implementation thereof. In the case of software implementation, operative steps may be implemented by proper code means included in a computer program, and performed when the program is run on a computer.

According to the present invention, the control data streams $DS_{CTRL,1}$ comprise (or mainly comprise) non-persistent control data, i.e. control data substantially time-varying over a predefined time period (for example, a scheduling period). Hereinafter, for the sake of ease, such control data streams will be referred to as non-persistent control data streams $DS_{CTRL,1}$. Thus, the non-persistent control data streams $DS_{CTRL,1}$ (processed at central unit CU side and subsequently transmitted over the optical fiber link $F_L$) represent only part of the control data streams associated with (i.e., having to be transmitted to the users equipment $UE_i$ together with) the information data streams $DS_{INFO}$, with the other part of the control data streams (that, as introduced and discussed later, comprise persistent control data, i.e. control data substantially time-unvarying over such a predefined time period) that, according to the present invention, are instead generated (and processed) locally within the receiving remote units $RU_j$.

The central unit CU also comprises a processing module 110 for receiving the information data streams $DS_{INFO}$ and providing, for each i-th user equipment $UE_i$, a number $N_S$ (e.g., $N_S \geq 1$ in the multi-antenna scenario herein considered) of information symbols streams $S_{INFOi,n}$ (each n-th information symbol stream among the $N_S$ information symbol streams associated with the i-th user equipment $UE_i$ comprising a number of information symbols $s_{INFOi,n}$), and for receiving the non-persistent control data streams $DS_{CTRL,1}$ and providing $N_S$ corresponding non-persistent control symbols streams $S_{CTRL,1n}$ (each n-th non-persistent control symbols stream among the $N_S$ non-persistent control symbols streams comprising a number of non-persistent control symbols $s_{CTRL,1n}$).

In order to achieve that, the processing module 110 is preferably configured to perform encoding processing (e.g., comprising well-known "Cyclic Redundancy Code" insertion, segmentation, channel coding, rate matching—i.e., puncturing/repetition—operations), error correction processing (e.g., by means of "Hybrid Automatic Repeat Request" (H-ARQ) operations that manage retransmission at physical layer level by means of, for example, "Chase Combining" or "Incremental Redundancy" techniques), and interleaving, modulation and MIMO processing (e.g., based on "Spatial Multiplexing" or on "Space-Time Coding") on the information data stream $DS_{INFO}$, and encoding interleaving, modulation and MIMO processing on the non-persistent control data stream $DS_{CTRL,1}$ (indeed, H-ARQ operations are usually not required on the control data stream, as the latter being generally transmitted by means of robust channel coding schemes).

The central unit CU also comprises a modulating/mapping module 115 configured to receive the information $S_{INFOi,n}$ and non-persistent control $S_{CTRL,1n}$ symbols streams, and to modulate the information $S_{INFOi,n}$ and control $S_{CTRL,1n}$ symbols thereby obtaining corresponding information $S^*_{INFOi,n}$ and non-persistent control $S^*_{CTRL,1n}$ OFDM symbols (as well as corresponding information $S^*_{INFOi,n}$ and non-persistent control $S^*_{CTRL,1n}$ OFDM symbols streams). The modulating is preferably carried out according to proper radio resources allocation scheduling functions, e.g. resident at the MAC layer—as conceptually shown in the figure by arrow connection, denoted by "RRA scheduling" wording, from the control module 105 to the modulating/mapping module 115.

Although not shown, the information $S^*_{INFOi,n}$ and non-persistent control $S^*_{CTRL,1n}$ OFDM symbols streams are then subject to electrical-to-optical conversion, and transmitted to the remote units $RU_j$ over the optical fiber (fronthaul) link $F_L$—e.g., by means of standard transmission formats defined by international consortia such as CPRI ("Common Public Radio Interface") or OBSAI ("Open Base Station Architecture Initiative").

As visible in the figure, the modulating/mapping module 115 is also configured to receive the information $DS_{INFO}$ and non-persistent control $DS_{CTRL,1}$ data streams, and, under the control of the radio resources allocation scheduling functions, to map them in Ns time-frequency radio resources grids $TFG_n$. Each n-th time-frequency radio resources grid $TFG_n$ contains the complete set of available PRBs, and, identifies, among them, the allocated PRBs for the n-th information OFDM symbols streams $S^*_{INFOi,n}$ of all the I user equipment $UE_i$ and for the n-th non-persistent control OFDM symbols streams $S^*_{CTRL,1n}$. Although not shown, mathematic relationships, formula or dynamic look-up tables defining the mapping are preferably provided by the central unit CU to the remote units $RU_j$ (e.g., for de-mapping operations) in the form of control information, e.g. refreshed at a refresh rate corresponding to a transmission frame or to the scheduling period.

Each n-th time-frequency radio resources grid $TFG_n$ is, conceptually, a matrix having a number R of rows equal to the number of radio resources (i.e., OFDM sub-carriers, in the example at issue) used for transmission and a number C of columns equal to the number of OFDM symbols in one frame period.

According to the present invention, as mentioned above, persistent control data substantially time-unvarying over the considered predefined time period (e.g., the scheduling period) are generated locally within the receiving remote units $RU_j$, and combined with the received information and control data. In the exemplarily considered example wherein the information and control data received by the remote units $RU_j$ are in the form of information $s^*_{INFOi,n}$ and (non-persistent) control $s^*_{CTRL,1n}$ OFDM symbols, the persistent control data generated within the remote units $RU_j$ are generated in the form of OFDM symbols as well (for the sake of consistency, so as to allow the combining), hereinafter referred to as persistent control OFDM symbols $s^*_{CTRL,2n}$. As should be readily understood, differentiation between non-persistent control OFDM symbols $s^*_{CTRL,1n}$ and persistent control OFDM symbols $s^*_{CTRL,2n}$ should not be construed limitatively, it being understood that not all the possible persistent control data (or the data deemed persistent with respect to the considered time period) are necessarily to be generated (and processed) within the receiving remote units $RU_j$ (i.e., for mobile network 100 design issues, some persistent control data may be part of the non-persistent control data streams $DS_{CTRL,1}$ instead of being generated and processed locally within the receiving remote units $RU_j$).

Thus, the control OFDM symbols streams $S^*_{CTRL,1n}$ at central unit CU side, "deprived" with the persistent control OFDM symbols $s^*_{CTRL,2n}$ generated at remote unit $RU_j$ side, and the corresponding time-frequency radio resources grids $TFG_n$, provide a reduced data rate over the fiber link $F_L$ with respect to the known solutions.

Turning now to FIG. 2 (schematically showing some relevant modules of a generic remote unit $RU_j$ according to an embodiment of the present invention), each (or at least one) remote unit $RU_j$, comprises a generation module 205 for generating the persistent control OFDM symbols $s^*_{CTRL,2n}$ (or the corresponding persistent control data in other forms).

Persistent control OFDM symbols $s^*_{CTRL,2n}$ may comprise pilot symbols, i.e. known reference symbols (or other reference data) inserted in (or mapped onto) the OFDM time-frequency radio resources grids $TFG_n$ for channel estimation, and hence for coherent demodulation at the user equipment $UE_i$ side.

The pilot symbols have complex values, which are determined according to the symbol position as well as the identity of the cell. LTE specifications refer to this as a two-dimensional reference-signal sequence, which is a function of the LTE cell identity. There are 504 reference signal sequences corresponding to 504 different cell identities. Broadly speaking, generation of the pilot symbols is carried out from a two-dimensional pseudo-random sequence (e.g., a length-31 pseudo-random Gold sequence), and a two-dimensional orthogonal sequence. There are 168 different pseudo-random sequences corresponding to 168 cell-identity groups, and three orthogonal sequences each corresponding to a specific cell identity within the cell identity group. In other words, the pseudo-random sequence generator is initialized with an initialization value that depends on the cell identity univocally identifying the cell, so that different pseudo-random Gold sequences are associated to different cells.

As a result of that, pilot symbols of different cells have low values of cross-correlation, so that interference arising from neighboring cells can be reduced by proper averaging on frequency and time adjacent pilot symbols received at the user equipment $UE_i$.

The pilot symbols $r_{l,n_s}(m)$ are defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

wherein
$n_s$ is the slot number within a radio frame,
l is the OFDM symbol number within the slot,
m is the PRB number,
c(i) is the pseudo-random length-31 Gold sequence.

As mentioned above, the pseudo-random sequence generator is initialized, at the start of each OFDM symbol, with $$c_{init} = 2^{10} \cdot (7 \cdot (n_s+1)+l+1) \cdot (2 \cdot N_{ID}^{cell}+1)+2 \cdot N_{ID}^{cell}+N_{CP}$$

wherein $$N_{CP} = \begin{cases} 1 & \text{for normal } CP \\ 0 & \text{for external } CP \end{cases}$$

and wherein $$N_{ID}^{cell} = 3N_{ID}^{(1)} + N_{ID}^{(2)}$$

being $N_{ID}^{cell}$ the univocal cell identity, $N_{ID}^{(1)}$ one among the 168 cell-identity groups (e.g., $N_{ID}^{(1)}$ ranging from 0 to 167), and $N_{ID}^{(2)}$ one among the 3 specific cell identities within the cell identity group (e.g., $N_{ID}^{(2)}$ ranging from 0 to 2).

At multiplexing and mapping module 210, the generated pilot symbols $r_{l,n_s}(m)$ (or, generally, the persistent control OFDM symbols $s^*_{CTRL,2n}$) are multiplexed and mapped onto the OFDM time-frequency radio resources grids $TFG_n$ for channel estimation, and hence for coherent demodulation at the user equipment $UE_i$ side.

Specifically, the pilot symbols $r_{l,n_s}(m)$ are inserted in the first and third last OFDM symbols of each 0.5 ms slot, when considering the case of normal "Cyclic Prefix" (CP). There is one pilot symbol $r_{l,n_s}(m)$ transmitted per downlink antenna port (with the number of downlink antenna ports equal to 1, 2, or 4). The pilot symbols $r_{l,n_s}(m)$ of different antenna ports are orthogonal to each other, as resource elements used for pilot symbols $r_{l,n_s}(m)$ transmission on any of the antenna ports in a slot are not used for any transmission on any other antenna port in the same slot and set to zero.

As should be readily understood, generation of the pilot symbols $r_{l,n_s}(m)$ directly in the remote units $RU_j$, requires a small amount of control information that can be configured for example via "Operation and Maintenance" (O&M) commands during mobile network 100 setup (as conceptually illustrated in the figure by O&M commands input to the generation module 205). In the specific example herein considered, the generation module 205 would just require the univocal cell identity $N_{ID}^{cell}$. The frequency shift $v_{shift}$ of the pilot symbols $r_{l,n_s}(m)$ pattern can be instead calculated locally in the remote unit $RU_j$ according to 3GPP LTE standard, namely:

$$v_{shift} = N_{ID}^{cell} \mod 6$$

In case of one, two and four antenna ports, the number of sub-carriers per PRB dedicated to the pilot symbols $r_{l,n_s}(m)$ would be equal to 4, 8 and 12, respectively, and the associated overhead over the total number of available sub-carriers (i.e., equal to 12*7=84 sub-carriers per PRB in case of normal CP) would be about 4.8%, 9.5% and 14.3% respectively. Thus, by means of the local generation of the pilot symbols $r_{l,n_s}(m)$ in the remote units $RU_j$, load reduction on the fronthaul link of the above percentages is achieved for each remote unit $RU_j$.

Additionally or alternatively to pilot symbols $r_{l,n_s}(m)$, the persistent control OFDM symbols $s^*_{CTRL,2n}$ may comprise primary and secondary synchronization symbols, which a user equipment $UE_i$ wishing to access the LTE system detects for complete time and frequency synchronization and for acquiring useful system parameters that are necessary to demodulate downlink signals and to transmit with correct timing—such as cell identity, cyclic prefix length, and access mode (FDD/TDD).

According to an embodiment of the present invention, the primary synchronization symbols are generated from frequency-domain Zadoff-Chu sequence depending on the of the value $N_{ID}^{(2)}$ that identifies one of the three cells identities within a given cell group, whereas the primary synchronization symbols are generated from an interleaved concatenation of two length-31 binary sequences depending on the group identifier $N_{ID}^{(1)}$.

As the number of sub-carriers per frame dedicated to the (primary and secondary) synchronization symbols, which is equal to 72×4=288 sub-carriers, generates, in the known solutions, an overhead ranging from about 0.3% (over the 600*14*10=84000 available sub-carriers, when the largest, 10 MHz, bandwidth provided by LTE standard is considered), to about 2.85% (over the 72*14*10=10080 available sub-carriers, when the smallest, 1.4 MHz, bandwidth provided by LTE standard is considered), local generation of the synchronization symbols in the remote units $RU_j$ allows achieving load reduction on the fronthaul link by the above percentages.

At multiplexing and mapping module 210, multiplexing and mapping of the primary and secondary synchronization symbols, possibly with the pilot symbols (when provided), onto the OFDM time-frequency radio resource grids $TFG_n$. By way of example only, assuming a Type 1 frame structure, the primary and secondary synchronization symbols are mapped to the last and second last, respectively, OFDM symbol in slots 0 and 10.

Then, base-band conversion is carried out at IFFT modules 215, each one performing an "Inverse Fast Fourier Transform" operation on the information $S^*_{INFOi,n}$ and control $S^*_{CTRLn}$ OFDM symbols (the control OFDM symbols $S^*_{CTRLn}$ comprising both non-persistent $S^*_{CTRL,1n}$ and persistent $S^*_{CTRL,2n}$ control OFDM symbols), thereafter at the processing modules 220 the resulting base-band signals are filtered, converted from digital to analog, up-converted from base-band to radio-frequency, and amplified before being radiated by the antennas $A_{jk}$ to the user equipment $UE_i$.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

Although in the present description explicit reference to pilot symbols as well as primary and secondary synchronization symbols has been made, this should not be construed limitatively. Indeed, other control signals or channels having characteristic of persistence may be generated locally in the remote units.

Moreover, although in the present description explicit reference to transmission, over the fronthaul link, of (information, control, pilot and synchronization) data in the form of symbols has been made, this should not be construed limitatively. Indeed, same considerations apply when transmission of (information, control, pilot and synchronization) signals in the form of other data is considered.

In addition, analogous considerations apply if the mobile network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to mobile network based on the LTE standard, it should be understood that it is not in the intentions of the Applicant to be limited to the implementation of any particular mobile network architecture or protocol.

Moreover, although in the present description explicit reference to optical fiber links has been made, this should not be construed limitatively. Indeed, the principles of the present invention may be also applied to scenarios wherein fronthaul link is managed by means of wireless links instead of the optical fiber link.

Finally, the method could be easily applied also to a system different than OFDMA based ones. By way of example only, in case of systems based on CDMA ("Code Division Multiple Access") technique, such as the 3GPP UMTS/HSDPA system, the principles of the present invention described above may be applied with simple modifications. For example, a skilled person, in the light of the teachings of the present invention, may operate so as to execute spreading and scrambling operations in the remote units, thereby making it possible to transmit the different user signals in the fronthaul link as separate signals. This would allow transmitting only the signals of the users that are actually allocated for transmission, with the clear advantage that the transmission rate on the fronthaul link would become proportional to the actual load on the radio interface. In turn, this would allow performing statistical multiplexing/load balancing among the remote units connected to the same fronthaul network.

The invention claimed is:

1. A method of arranging, in a mobile communication network, transmission of data between user equipment and a base station comprising a central unit and at least one remote unit associated therewith, the method comprising:
    at the central unit, transmitting information data and first control data to the at least one remote unit, wherein the first control data is associated with the information data, and wherein the first control data is time-varying over a scheduling time period, and
    at an at least one selected remote unit:
        receiving the information data and the first control data from the central unit,
        generating second control data, wherein the second control data is time-unvarying over the scheduling time period,
        combining the generated second control data with the received information and the first control data into data comprising the information data, the first control data, and the second control data, and
        transmitting the data to a selected user equipment.

2. The method of claim 1, wherein each remote unit of the at least one remote unit is associated with at least one cell of the mobile communication network, wherein the second control data comprises reference data, and wherein the generating the second control data comprises generating at least one pseudo-random sequence each one associated with a respective one of the at least one cell of the mobile communication network.

3. The method of claim 2, wherein the generating at least one pseudo-random sequence further comprises initializing each generated pseudo-random sequence with an initialization value depending on a cell identifier univocally identifying the cell.

4. The method of claim 3,
    wherein the second control data further comprises synchronization data,
    wherein the generating the second control data comprises:
        generating primary synchronization data from a frequency-domain Zadoff-Chu sequence depending on a first parameter identifying the cell within a given cell group, and
        generating secondary synchronization data from a sequence comprising an interleaved concatenation of two length-31 binary sequences, and depending on a second parameter identifying the given cell group.

5. The method of claim 2, wherein the data comprises Orthogonal Frequency Division Multiple symbols, and wherein the at least one pseudo-random sequence depends on a slot number within a radio frame, an Orthogonal Frequency Division Multiple symbol number within a slot, and on a radio resource number.

6. The method of claim 1, wherein the transmitting comprises transmitting in a frequency domain.

7. The method of claim 1, wherein the second control data further comprises synchronization data.

8. The method of claim 1, wherein the combining the generated second control data with the received information data into the data comprises multiplexing and mapping the generated second control data with the received information and the first control data.

9. A non-transitory computer readable medium including software code portions stored thereon that, when executed by a computer, perform the method of claim 1.

10. A system for exchanging data with user equipment in a mobile communication network, the system comprising:
    at least one remote unit configured to:
        receive information data and first control data from a central unit associated with the at least one remote unit, wherein the first control data is associated with the information data, and wherein the first control data is time-varying over a scheduling time period,
        generate second control data, wherein the second control data is time-unvarying over the scheduling time period,
        combine the generated second control data with the received information and the first control data into data comprising the information data, the first control data, and the second control data, and
        transmit the data to selected user equipment.

11. The system of claim 10, further comprising the central unit, the central unit being configured to transmit the information data and the first control data to the at least one remote unit.

12. The system of claim 11, wherein the at least one remote unit is connected to the central unit by optical fiber links.

13. The system of claim 11, wherein the at least one remote unit is connected to the central unit by wireless communication links.

14. The system of claim 10, wherein each remote unit of the at least one remote unit is associated with at least one cell of the mobile communication network, wherein the second control data comprises reference data, and wherein the generating the second control data comprises generating at least one pseudo-random sequence each one associated with a respective one of the at least one cell of the mobile communication network.

15. The system of claim 14, wherein the generating at least one pseudo-random sequence further comprises initializing each generated pseudo-random sequence with an initialization value depending on a cell identifier univocally identifying the cell.

16. The system of claim 15,
wherein the second control data further comprises synchronization data,
wherein the generating the second control data comprises:
generating primary synchronization data from a frequency-domain Zadoff-Chu sequence depending on a first parameter identifying the cell within a given cell group, and
generating secondary synchronization data from a sequence comprising an interleaved concatenation of two length-31 binary sequences, and depending on a second parameter identifying the given cell group.

17. The system of claim 14, wherein the data comprises Orthogonal Frequency Division Multiple symbols, and wherein the at least one pseudo-random sequence depends on a slot number within a radio frame, an Orthogonal Frequency Division Multiple symbol number within a slot, and on a radio resource number.

18. The system of claim 10, wherein the transmitting comprises transmitting in a frequency domain.

19. The system of claim 10, wherein the second control data further comprises synchronization data.

20. The system of claim 10, wherein the combining the generated second control data with the received information data into the data comprises multiplexing and mapping the generated second control data with the received information and the first control data.

* * * * *